INVENTORS
JEAN BICHE
LEON ANDOUART
ATTY.

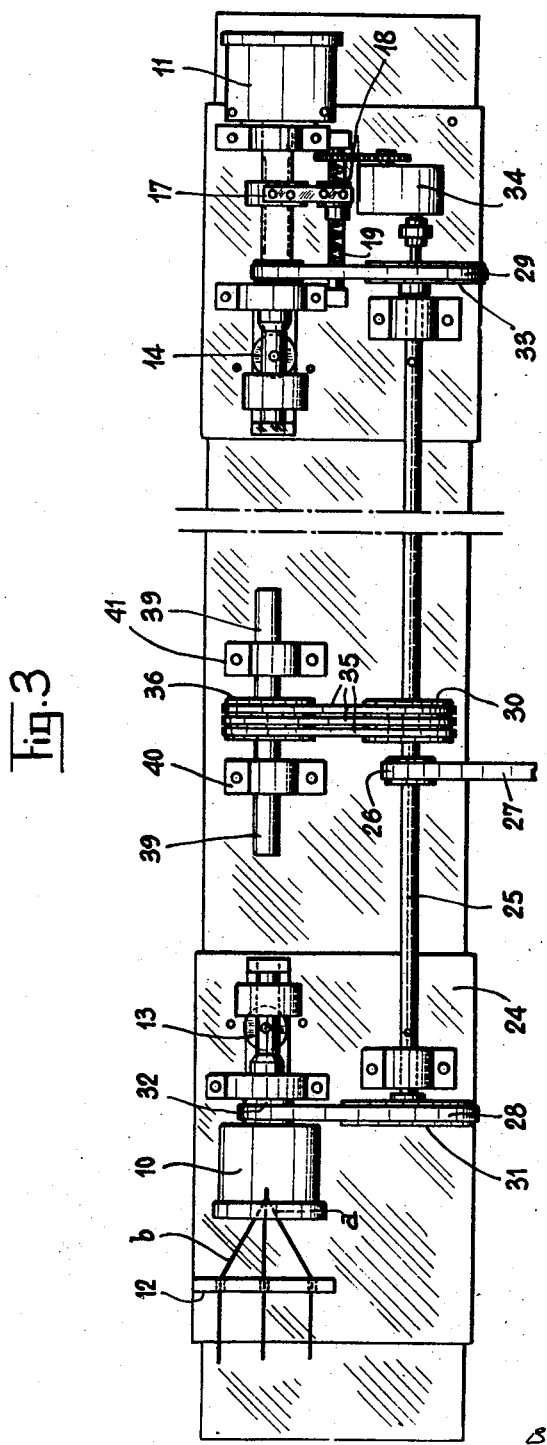

June 21, 1960
J. BICHE ET AL
2,941,348
MANUFACTURE OF WIRE STRANDS, BUNCHES AND CABLES
Filed Aug. 1, 1958
6 Sheets-Sheet 4
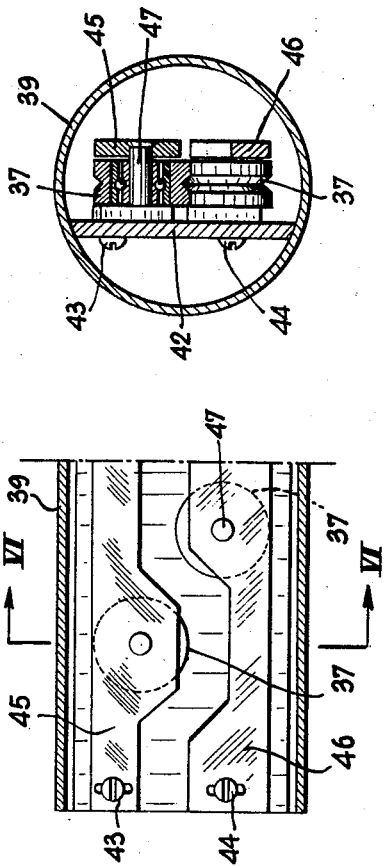
Fig. 6
Fig. 5
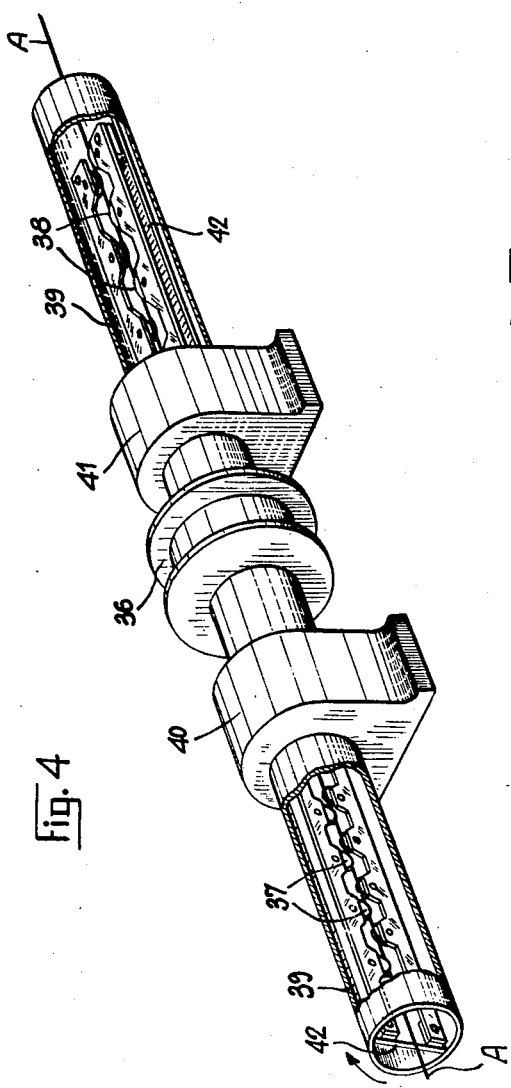
Fig. 4
INVENTORS
JEAN BICHE
LEON ANDOUART
By Irwin S. Thompson
ATTY.

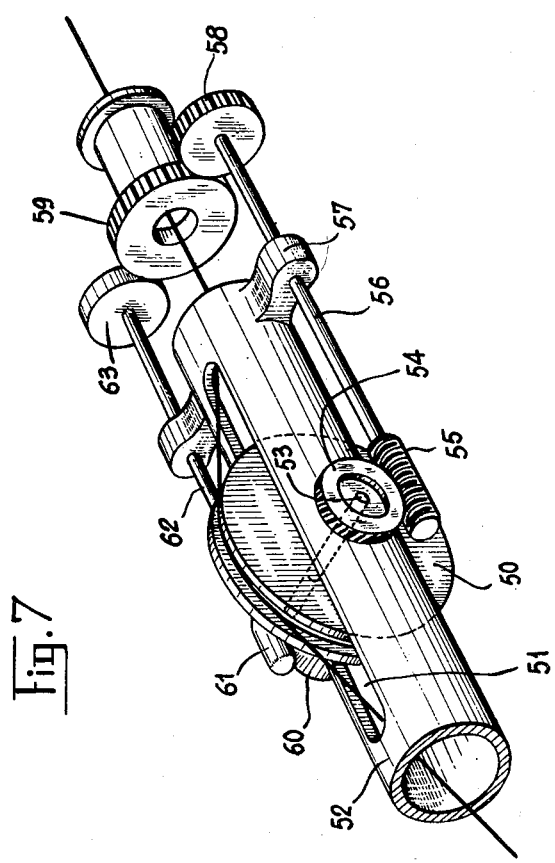

INVENTORS
JEAN BICHE
LEON ANDOUART

United States Patent Office 2,941,348
Patented June 21, 1960

2,941,348

MANUFACTURE OF WIRE STRANDS, BUNCHES, AND CABLES

Jean Biche and Léon Andouart, Paris, France; said Biche assignor to Societe le Materiel de Cablerie, Courbevoie, France, a corporation of France Filed Aug. 1, 1958, Ser. No. 752,670

Claims priority, application France Aug. 10, 1957

11 Claims. (Cl. 57—7)

This invention relates to the manufacture of wire strands and bunches as components of wire rope and cables, especially cables for use as electrical conductors; the invention also relates to the construction of such cables themselves.

In the ensuing specification and claims, for clarity, the word strand will generally be used to designate both strands properly so-called, i.e. assemblies comprising a plurality of wires wound in a predetermined regular order about a core, and bunches, i.e. a plurality of wires wound or twisted together in more or less disorderly fashion. The cables contemplated by the invention may consist of either strands or bunches of wire as thus defined.

The most usual process for manufacturing a strand from a plurality of separate wire, is to provide an axial wire or core and impart thereto a continuous movement of axial feed or translation, and to twist a predetermined number of wires, e.g. six, twelve, eighteen or more, helically around the core, the rate of rotation of the wires around the core being so correlated with the rate of axial feed of the core as to obtain a predetermined helical pitch in the finished strand. The winding operation is performed by means of a stationary die to which the individual wires are fed from coils or reels carried by suitable supports which are generally rotatable. The resulting strand or bunch is in turn coiled on a reel about an axis transverse to the direction of feed.

Conventional apparatus for performing this process have generally given satisfactory performance. However, their output rate is limited by problems of dynamic balance in connection with the various rotating components of the apparatus, including the supply reels and supports therefor, rotary twisting frames, and the like. Thus, such twisting apparatus of conventional character cannot be operated at angular speeds much in excess of 2000 r.p.m. in the case of single-twist machines, and only 1000 r.p.m. for machines of the double-twist type, so that the resulting production rate is comparatively low.

It is an object of this invention to overcome this limitation and to permit achievement of greatly increased angular velocities and correspondingly heightened production rates, and to accomplish this result with apparatus that is of simple construction and less space-consuming than conventional apparatus.

In accordance with the invention, a feeding device for individual wires is used and the twisting or winding operation is performed by means of a rotating die with the resulting strand or bunch being received in a hollow receiver rotated coaxially with the die and the core wire.

With such a process, a residual twist is retained at the outlet of the die and this may be liable to create internal torsional stresses detrimental to the strength characteristics of the final product. Hence, the invention may further contemplate the provision of means for eliminating such torsion stresses. Such compensating means may comprise a set of straightener rollers which may act for example in two rectangular planes. Moreover, suitable heating means may be provided for annealing the resulting strand or bunch as it is fed out from the apparatus.

An arrangement according to the invention, in that it eliminates problems relating to the balancing of rotating supply reels, makes it possible to attain substantially higher angular velocities than with conventional apparatus, and velocities as high as and higher than 5000 r.p.m. can readily be achieved. This represents an increase in production by a factor of two or three.

The method of the invention moreover can conveniently serve to provide the strand or bunch being formed with its insulation coating at the same time as it is formed. Thus, by passing the strand or bunch through a suitable jack frame or the like, a wire directly provided with its insulation coating can directly be obtained. If desired, plastic insulation comprising a plurality of helically wound coloured strips can be obtained in accordance with the procedure described in the applicants' patent application No. 686,494, of September 26, 1957.

The present invention is further applicable to the manufacture of cables from component strands or bunches. For this purpose, the die would be supplied with strands or bunches, produced by the method described above or by conventional methods, instead of being supplied with individual wires. Thus, a cable rather than a strand will be collected in the form of a coil within the hollow receiver rotated around the axis of feed of the core strand.

Whereas conventional cabling machines have to be rotated at a relatively slow rate and hence have a correspondingly low output, the method of the invention makes it possible to achieve rotation speeds of several hundred, and even up to several thousand r.p.m., thereby greatly increasing the production rate, while using less complicated apparatus.

The accompanying drawings illustrate embodiments of the invention.

Fig. 1 is a diagrammatic perspective view illustrating the process of forming a strand;

Fig. 2 similarly illustrates in perspective a somewhat more elaborate embodiment of the process;

Fig. 3 is a general plan view of a twisting machine according to the invention;

Fig. 4 shows in perspective, twist-eliminating means according to the invention;

Fig. 5 is a fragmentary longitudinal section of the device of Fig. 4;

Fig. 6 is a transverse section on line VI—VI of Fig. 5;

Fig. 7 is a perspective view of a draft winch device;

Figure 1:
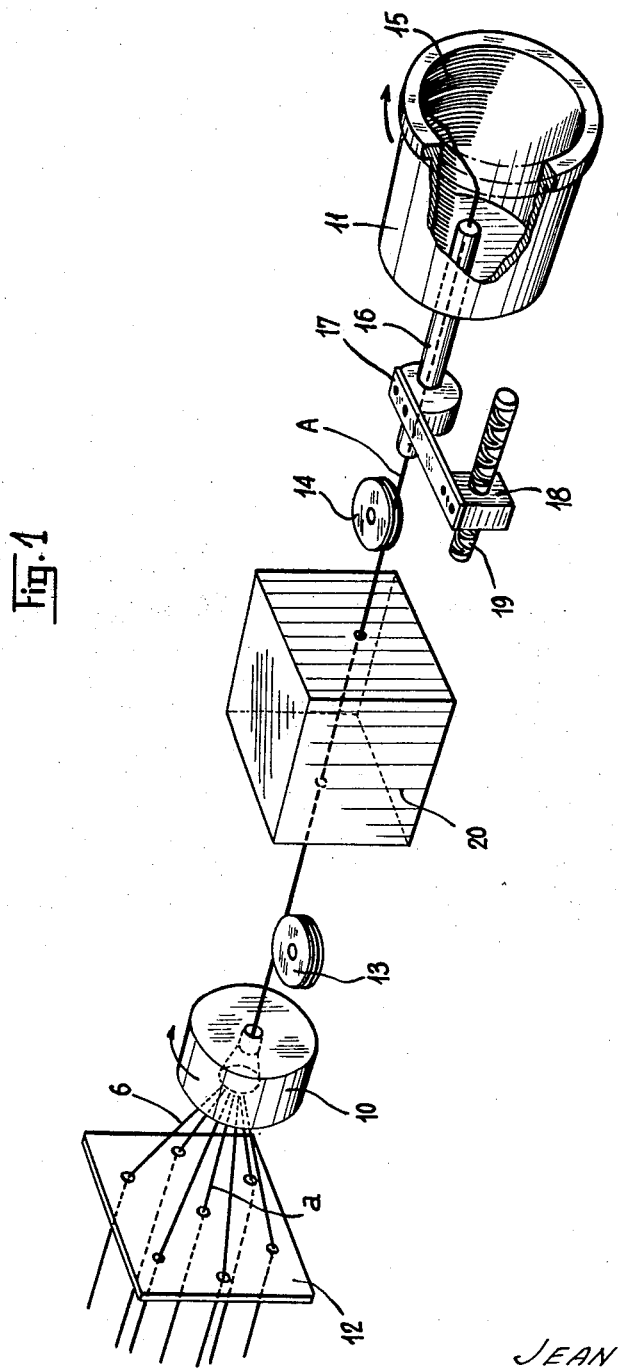

The system shown in Fig. 1 performs the general function of receiving individual wires such as $a$ and $b$ and forming a twisted strand A therefrom. It essentially comprises a rotary die 10 and a hollow receiver capacity 11, rotatable about the same axis as that of the die, which in turn is coincident with the center axis of the center or core wire $a$ and the axis of. the strand A. The wire $a$ constitutes the core of the strand, and the surrounding wires $b$ herein shown as being six in number, are helically wound around the core wire $a$ and are all delivered from stationary reels and fed to the die 10 by way of a stationary guide plate 12. The wires $a$ and $b$ are advanced by the draft force exerted thereon by winches 13 and 14. The wires $a$, $b$ and the strand A are driven in rotation at high speed, e.g. 5000 r.p.m., by the rotation of the entire unit comprising the die 10, the winches 13 and 14, and the bowl 11. At the same time winch 13 pulls the resulting strand A forward. The strand is further advanced by the winch 14 to the hollow receiver capacity or bowl 11, where it is coiled by centrifugal action into a hollow coil 15. This coil is fed by an axially reciprocatory feed distributor comprising a feed tube 16 to which reciprocation is imparted by any suitable means, e.g. a bar 17 connected with a threaded ring 18 reciprocated by a rod 19 having a double screw thread threaded in the ring.

Between the winches 13 and 14, means 20 are preferably provided to eliminate the residual twist resulting from the fact that the die is revolving while the individual wires are delivered from a stationary distributor. The twist eliminating device may assume the form of an annealing furnace, or a set of straightener rollers to be later described, or both.

Figure 2:
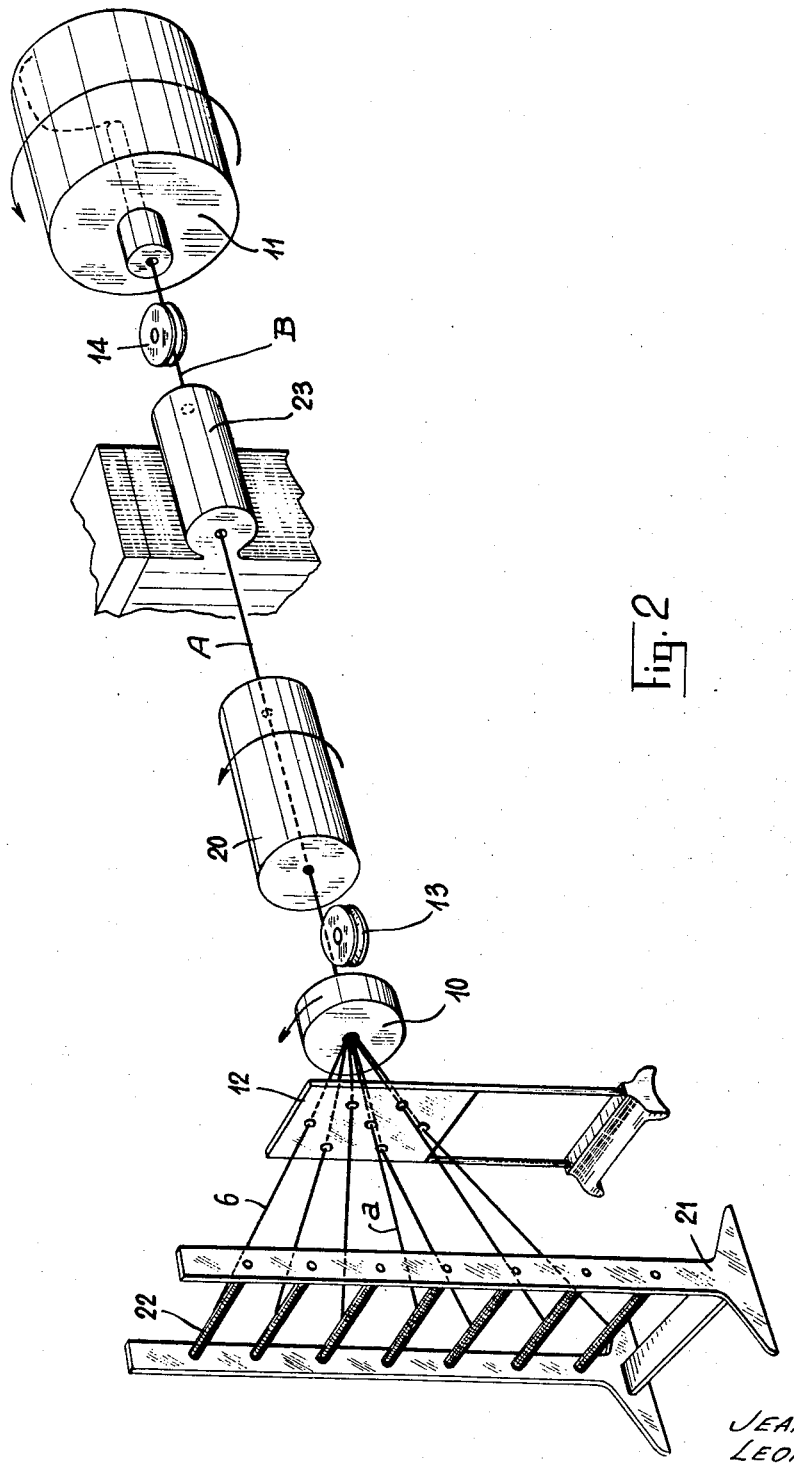

In the system shown in Fig. 2, similar components as those present in Fig. 1 have been given similar references. The axial core wire $a$ and the peripheral wires $b$ are here supplied from a conventional let-off frame 21 carrying the reels 22.

In this embodiment the strand A, after passing through the twist eliminator or straightener 20, is passed through a suitable coating or extruding machine or jack frame 23 whereby the strand is coated with a plastic cover which may include one or more coloured strips, and the insulated strand B is received in the hollow coiler device 11.

In the system shown in Fig. 3, elements generally similar to those shown in Figs. 1 and 2 and designated with the same reference numbers are all mounted on a frame 24 which further carries a transmission shaft 25 journalled upon it parallel to the rotation axis of the die 10 and coiler 11. Shaft 25 is driven by a pulley 26 connected by drive belt 27 with a motor not shown, and has pulleys 28, 29, 30 secured to it. The pulley 28 serves, by way of drive belt 31, to rotate the support 32 of die 10. Pulley 29 similarly drives, through belt 33, the coiler 11.

At the same time shaft 25 imparts reciprocation to the reciprocatory feeder 17—19 by way of reducer 34. Pulley 30, by way of belt 35, drives a pulley 36 connected with the straightener system including the two orthogonal sets of rollers 37 and 38.

One embodiment of such a straightener device is shown in detail in Figs. 4 to 6 as comprising a pair of tubular elements 39 each carrying a set of rollers 37 and 38 respectively, said tubular elements being connected with pulley 36 for bodily rotation thereby in the journal bearings 40 and 41. Positioned in each tube 39 is a vertical plate 42 which extends longitudinally of the tube, and which has secured to one side of it, by means of screws 43 and 44, a pair of vertically spaced supporting members 45 and 46 the facing surfaces of which are formed with cutouts, as shown in Fig. 5, to provide sinuous paths for the strands. A set of the afore-mentioned rollers such as 37 is journalled in each of the supporting members 45 and 46, being rotatably mounted on pins 47 by way of ballbearings 48 or the like. The rollers in the two sets are offset with respect to one another as shown in Fig. 5 and the roller peripheries project small distances into the path of the strand. The supports 45 and 46 are adjustable in relative position to allow the rollers to be moved towards and away from each other. The means mounting the rollers 38 in the other tube 39 are similar to those described, but arranged in a horizontal plan rather than vertically.

Longitudinal displacement of the individual wires $a$ and $b$ and of the wire strand A, is effected by the winches 13 and 14 previously mentioned, and illustrated in greater detail in Fig. 7.

Each winch may comprise a grooved pulley 50 positioned in a recess 51 formed in the walls of a hollow shaft 52 which is driven as by being bodily connected to either of the rotating units, die 10 or coiler 11.

The pulley 50 is secured on a pivot 53 which extends through the shaft 52 normally to the general axis of rotation of the system and to the direction of strand displacement. Secured on pivot 53 outwardly of shaft 52 is a gear 54 which meshes with a worm 55 formed or secured on the shaft 56 journalled in a bearing support 57 projecting from a side of recessed shaft 52. Secured on the opposite end of shaft 56 is a gear 58 which meshes with a stationary sungear 59 fixed on the frame of the machine so as to operate as a planet gear with respect to gear 59. Shown at 60, 61, 62 and 63 are dummy members respectively corresponding to the members 54, 55, 56, 58 and on the other side of the shaft 52 for balancing purposes.

Figure 8:
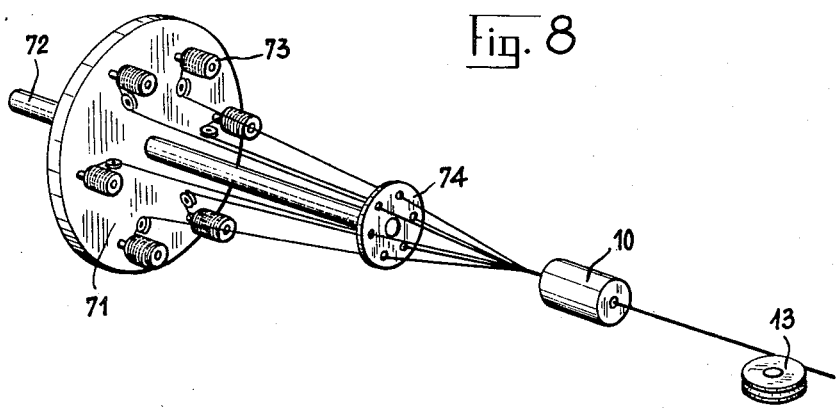
Fig. 8 is a simplified perspective view of a rotary feed system.

The individual wires rather than being delivered from reels or bobbins supported in a stationary let-off frame as shown in Fig. 2, may be fed from reels or bobbins supported on a rotary frame. Thus, Fig. 8 illustrates in simplified form a feed system for individual wires which comprises a rotating cage 71 secured on a shaft 72 and carrying a number of reels 73 in a circumferential array projecting from one face of it, each reel delivering an individual wire through a passage formed therefor in a guide plate 74 secured to shaft 72. The die 10, winch 13 and remaining components may be similar to those already described in the foregoing embodiments. It will be appreciated that in the construction shown in Fig. 8, the twist pitch in the strand will vary in accordance with the angular velocity of the rotary cage.

Figure 9:
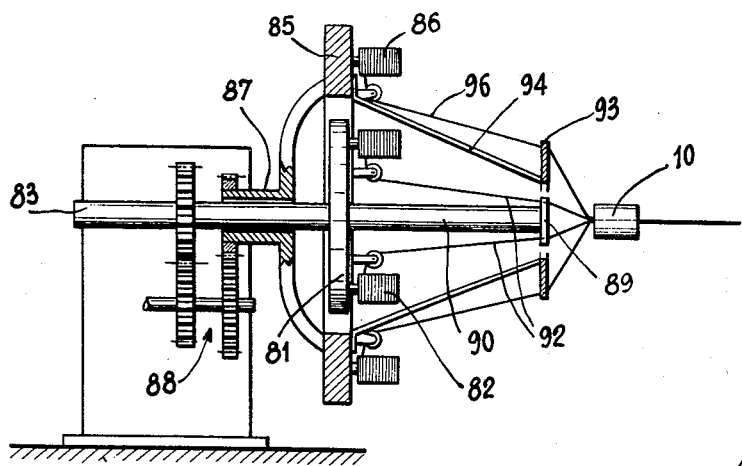
Fig. 9 is a simplified axial section, in elevation, of a rotary feed system using two coaxial rotary frames.

According to another modification of the invention, two or more rotary supports similar to that just described may be associated together and driven at different angular velocities. Fig. 9 schematically illustrates such a feed system which comprises a first cage 81 supporting the set of bobbins 82 and secured on a shaft 83, and a further cage 85 of annular configuration supporting the bobbins 86 and secured on a tubular shaft 87 coaxially surrounding the shaft 83. The shafts 83 and 87 are arranged to be driven at different rates e.g. through differential mechanism 88. A guide 89 supported on the outer end of an extension 90 of the shaft 83 serves to guide the individual wires 92 delivered from the bobbins 82 towards the die 10. An annular guide 93 supported from the outer end of a conical member 94 secured to cage 85 similarly guides the wires 96 delivered from the bobbins 86 towards the same die 10.

With a system as just described, there would be produced a strand comprising two layers of wires wound with different helical pitches. Clearly such a system might be expanded to include more than two rotatable cages for producing strand having a corresponding number of layers of wires wound with desired helical pitch values.

Another advantage of a rotary feed system is in the production of insulated strands as already mentioned above, since in such cases the single or several (e.g. varicoloured) layers of insulation may be wound with a different pitch or different pitches from the pitch used in twisting the wires.

For details in the construction of various components of a strand- or bunch-making machine, reference may be had to the U.S. patent application mentioned previously. While apparatus according to the present invention might conveniently employ any of the teachings disclosed in that prior patent application, it will be understood that any other appropriate constructions may be used.

It will further be understood that by substituting strands or bunches of wire for the individual wires in the various arrangements disclosed herein, the teachings of the invention would be equally applicable to the construction of wire rope and cable from strands and bunches.

What we claim is:
1. Apparatus for producing twisted strands from individual wires, comprising means feeding out said wires, rotatable die means receiving said wires and imparting twist thereto on rotation of said die means to produce a strand, means rotatable with said die means for applying a draft force to said strand, and hollow coiler means rotatable coaxially with said die means and receiving said strand therein to coil the strand over an inner peripheral surface of said hollow means.

2. Apparatus for producing twisted strands from individual wires comprising means feeding out the individual wires, a die mounted for rotation and receiving said wires to impart twist thereto on rotation of the die to form a strand, means rotatable with the die to apply a pulling force to the strand, means for eliminating torsional stresses in said strand beyond the die, and a hollow coiler rotatable coaxially with the die and receiving the strand to coil the strand over an internal surface of said coiler.

3. Apparatus for forming strands from individual wires comprising a set of stationary reel means feeding out individual wires, stationary perforate guide means receiving said wires from the reels, a rotatable die receiving said wires from the guide means and twisting them into a strand on rotation of the die, means rotatable with the die for imparting a pulling force to the strand, and a hollow coiler rotatable coaxially with the die and receiving said strand to coil the strand over an internal surface of the coiler.

4. Apparatus for forming strands from wires, comprising a set of stationary reel means feeding out individual wires, a stationary perforate wire guide plate guiding the wires from the reel means, a rotatable die receiving said wires and twisting them into a strand, means rotatable with the die for pulling the strand axially thereof, means for straightening out the torsion stresses in the strand beyond the die, and a hollow coiler rotatable coaxially with the die for receiving the strand and coiling it over an internal surface of the coiler.

5. Apparatus for producing strands from wires comprising a rotatable cage, reels carrying individual wires on the cage, a rotatable die receiving the wires and twisting them into a strand on rotation of the reel, means rotatable with the die for applying an axial pulling force to the strand, and a hollow coiler rotatable coaxially with said cage and die and receiving said strand for coiling it over an internal surface of the coiler.

6. Apparatus for forming strands from individual wires comprising a rotatable cage, reels with individual wires supported on the cage, a rotatable die receiving the wires and twisting them into a strand on rotation of the die, means rotatable with the die for applying a draft force to the strand, means for straightening-out torsion stresses in the strand beyond the die, and a hollow coiler rotatable coaxially with the cage and die and receiving the strand for coiling it about an internal surface of the coiler.

7. Apparatus for forming a strand from individual wires comprising at least two coaxially rotatable cages, a set of reels of individual wires carried on each cage, means for rotating said cages at different speeds, a rotatable die receiving said wires for twisting them into a strand, means rotatable with the die for imparting a pulling force to the strand, and hollow rotatable coiling means coaxially with said cages and die and receiving said strand to coil it over an internal surface of said coiling means.

8. Apparatus for forming strand from individual wires comprising means feeding out individual wires, a rotatable die receiving said wires and twisting them into a strand on rotation of the die, means rotatable with the die for applying a pulling force to said strand, two sets of rollers journalled transversely to said strand and adapted to engage said strand in different planes beyond the die to straighten out the torsion strains in the strand, and a hollow coiling device rotatable coaxially with the die and receiving said strand to coil it over an internal surface of the coiling device.

9. Apparatus for twisting a strand from individual wires comprising means feeding out individual wires, a rotatable die receiving said wires and twisting them into a strand on rotation of the die, means rotatable with the die for exerting a pull on the strand, furnace means receiving said strand beyond the die to anneal the strand and straighten-out torsion strains therein, and a hollow coiling member rotatable coaxially with the die and receiving the strand to coil the strand about an internal surface of said member.

10. Apparatus for forming a strand from individual wires comprising means feeding out individual wires, a rotatable die receiving said wires and twisting them into a strand, means rotatable wth the die for applying a pulling force to the strand beyond the die, coating means receiving the strand for applying a coat of insulation thereover, and a hollow member rotatable coaxially with the die and receiving the strand for coiling it about an internal surface of said member.

11. Apparatus for producing a twisted strand of wire from rotatable wires comprising means feeding said wires, rotatable receiving means for said wires imparting twist thereto to produce a strand, means rotatable with said receiving means for applying a pulling force to the strand, and a coiler means coaxially rotatable with said receiving means for reception and coiling of said strand.

References Cited in the file of this patent

UNITED STATES PATENTS

| | | |
|---|---|---|
| 359,410 | Stone | Mar. 15, 1887 |
| 495,085 | Cookson | Apr. 11, 1893 |
| 1,753,793 | Lang | Apr. 8, 1930 |
| 1,862,345 | Wolf | June 7, 1932 |
| 1,950,988 | Luttenberger | Mar. 13, 1934 |
| 2,321,404 | McCann | June 8, 1943 |